(12) United States Patent
Lapham

(10) Patent No.: US 12,365,505 B2
(45) Date of Patent: Jul. 22, 2025

(54) PACKAGES FOR AND METHODS OF PACKAGING FOOD PRODUCTS

(71) Applicant: Martin Lapham, Rye, NH (US)

(72) Inventor: Martin Lapham, Rye, NH (US)

(73) Assignee: Popzup Popcorn, Somersworth, NH (US)

( * ) Notice: Subject to any disclaimer, the term of this patent is extended or adjusted under 35 U.S.C. 154(b) by 0 days.

(21) Appl. No.: 18/819,491

(22) Filed: Aug. 29, 2024

(65) Prior Publication Data

US 2024/0417129 A1 Dec. 19, 2024

Related U.S. Application Data

(63) Continuation of application No. 16/285,847, filed on Feb. 26, 2019, now abandoned, which is a continuation-in-part of application No. 15/002,504, filed on Jan. 21, 2016, now abandoned, which is a continuation-in-part of application No. 12/704,954, filed on Feb. 12, 2010, now abandoned.

(51) Int. Cl.
| | |
|---|---|
| *B65D 5/00* | (2006.01) |
| *B65D 5/20* | (2006.01) |
| *B65D 5/30* | (2006.01) |
| *B65D 5/355* | (2006.01) |
| *B65D 5/60* | (2006.01) |
| *B65D 5/68* | (2006.01) |
| *B65D 81/34* | (2006.01) |
| *B65D 85/36* | (2006.01) |

(52) U.S. Cl.
CPC ......... *B65D 5/0005* (2013.01); *B65D 5/2038* (2013.01); *B65D 5/301* (2013.01); *B65D 5/685* (2013.01); *B65D 81/3469* (2013.01); *B65D 85/36* (2013.01)

(58) Field of Classification Search
CPC .. B65D 5/0005; B65D 5/2038; B65D 5/2042; B65D 5/301; B65D 5/685; B65D 81/3469; B65D 85/36; B65D 5/10
See application file for complete search history.

(56) References Cited

U.S. PATENT DOCUMENTS

| | | | | |
|---|---|---|---|---|
| 2,177,698 A | * | 10/1939 | Name not available | B31B 70/30 53/469 |
| 2,361,984 A | * | 11/1944 | Williamson | B65D 5/0005 206/268 |
| 4,038,425 A | * | 7/1977 | Brandberg | B65D 81/3469 229/101 |

(Continued)

*Primary Examiner* — Ericson M Lachica
(74) *Attorney, Agent, or Firm* — Barclay Damon LLP; Daniel McGrath

(57) ABSTRACT

A package for food products including a first portion, a second portion, and at least one indicator. The first portion has a first closed end, at least one first side wall surrounding the first closed end, and a first open end opposite the first closed end. The second portion has a second closed end, at least one second side wall surrounding said second closed end, and a second open end opposite the second closed end. The first portion and second portion are movably connected at their respective open ends. The at least one indicator is placed in communication with the package such that when the package is expanded to a desired inner volume the indicator is activated. The closed end of either portion may be opened when a desired inner volume of a food product is reached.

11 Claims, 11 Drawing Sheets

(56) References Cited

U.S. PATENT DOCUMENTS

| | | | | |
|---|---|---|---|---|
| 4,474,324 A * | 10/1984 | Forbes, Jr. | ............... | B65D 5/10 |
| | | | | 220/8 |
| 4,483,095 A * | 11/1984 | Webinger | ............ | A01M 1/2055 |
| | | | | 239/58 |
| 4,586,649 A * | 5/1986 | Webinger | ........... | B65D 81/3453 |
| | | | | 426/123 |
| 4,734,288 A * | 3/1988 | Engstrom | ........... | B65D 81/3453 |
| | | | | 426/118 |
| 4,860,892 A * | 8/1989 | Roberts | ................... | G09F 23/00 |
| | | | | 220/663 |
| 4,861,958 A * | 8/1989 | Bohrer | ............... | B65D 81/3453 |
| | | | | 426/243 |
| 5,016,753 A * | 5/1991 | Henderson | ........... | B65D 5/0005 |
| | | | | 229/125.32 |
| 6,126,976 A * | 10/2000 | Hasse, Jr. | ........... | B65D 81/3453 |
| | | | | 426/243 |
| 6,240,839 B1 * | 6/2001 | Amato | ................... | A21C 13/00 |
| | | | | 99/468 |
| 2002/0100755 A1 * | 8/2002 | Peterson | ............ | B65D 81/3469 |
| | | | | 219/730 |
| 2005/0271774 A1 * | 12/2005 | Berthault | ............... | B65D 5/103 |
| | | | | 426/104 |
| 2006/0042986 A1 * | 3/2006 | Simkowski | .......... | B65D 75/366 |
| | | | | 206/467 |
| 2009/0169688 A1 * | 7/2009 | Ehmann | ................... | A23L 7/161 |
| | | | | 426/107 |
| 2009/0277336 A1 * | 11/2009 | Berthault | ........... | B65D 81/3453 |
| | | | | 99/323.5 |
| 2011/0253772 A1 * | 10/2011 | Holch | .................. | B65D 5/0005 |
| | | | | 229/101.2 |
| 2011/0253776 A1 * | 10/2011 | Craft | ................... | B65D 5/0005 |
| | | | | 229/117.27 |

* cited by examiner

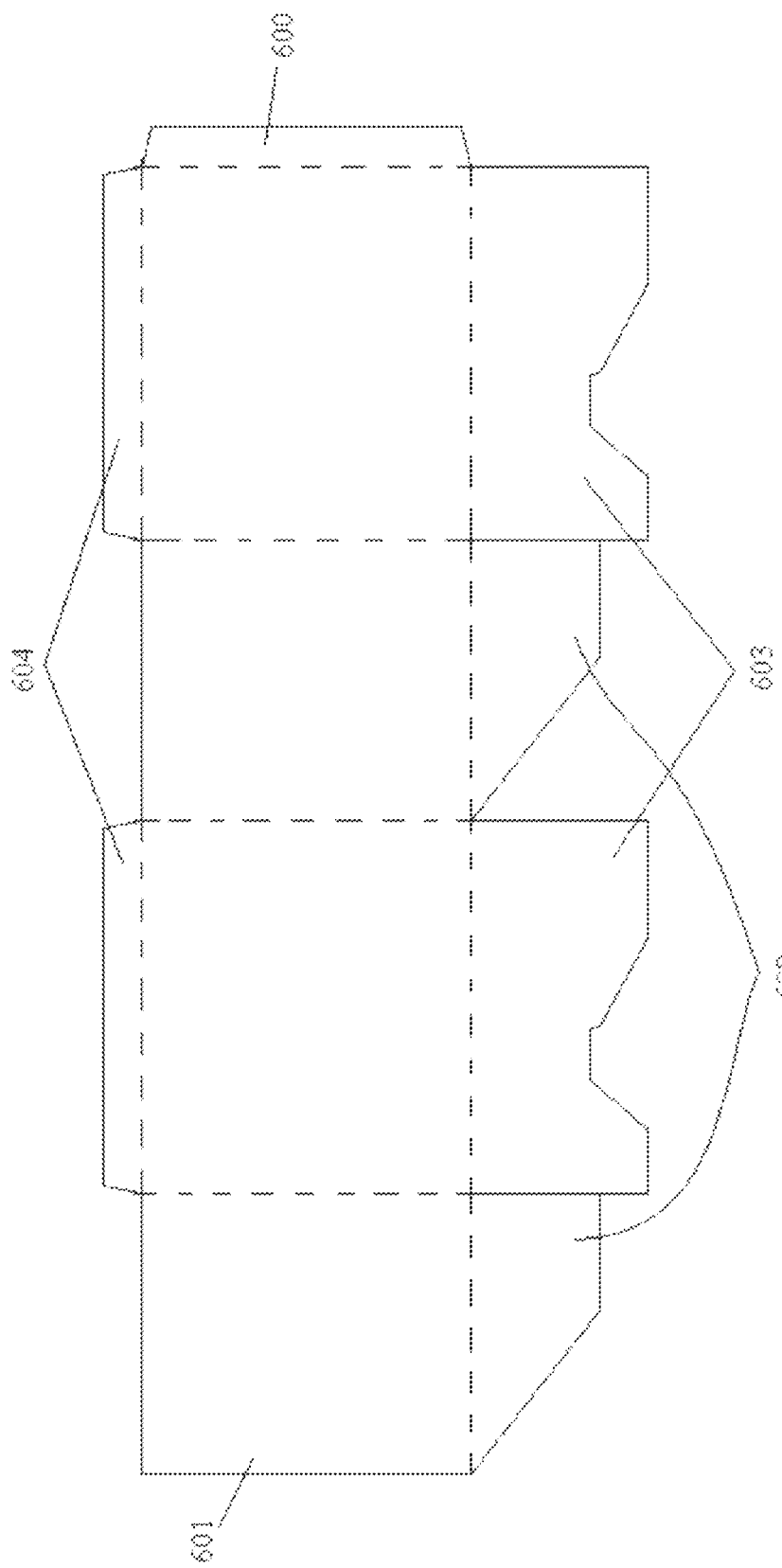

PACKAGES FOR AND METHODS OF PACKAGING FOOD PRODUCTS

CROSS-REFERENCE TO RELATED APPLICATIONS

This application is a continuation of co-pending U.S. patent application Ser. No. 16/285,847, filed Feb. 26, 2019, and entitled PACKAGES FOR AND METHODS OF PACKAGING FOOD PRODUCTS, which is a continuation-in-part of U.S. patent application Ser. No. 15/002,504, filed Jan. 21, 2016, and entitled PACKAGES FOR AND METHODS OF PACKAGING FOOD PRODUCTS, which and is a continuation-in-part of U.S. patent application Ser. No. 12/704,954, filed Feb. 12, 2010, and entitled PACKAGES AND METHODS OF PACKAGING FOOD PRODUCTS, the contents of each of which are incorporated by reference herein in their entirety for all purposes.

FIELD OF THE INVENTION

In general, the invention relates to a packaging device for food products. More particularly, the invention relates to expandable packages for food products.

BACKGROUND OF THE INVENTION

The art of food packaging is well developed. For example, within the art of dough packaging there are multiple ways of packaging proofed and un-proofed dough. Proofing dough is know in the art to mean allowing dough containing a leavening agent to rise for the proper amount of time such that the dough reaches a desired volume.

U.S. Pat. No. 6,635,291, Perry, entitled Leavened Dough or Batter Packaging System discloses a package for leavened dough designed to hold a desired internal equilibrium pressure.

U.S. Pat. No. 6,733,803, Vidkjaer, entitled Dough Containing, Valved Package discloses a package for dough that does not have to be proofed having a one-way venting valve to allow gas to escape from the package.

U.S. Pat. No. 1,861,124, Lorber, entitled Biscuit Package discloses a package for uncooked biscuits having a telescoping cover which provides space for the risen dough. Further, Lorber's design has a channel for receiving the telescoping cover and requires separation of a number of dough cakes with interposed circular disks which may complicate producing such a design.

U.S. Pat. No. 6,240,839, Amato, entitled Device for Proofing Dough discloses a mechanical device having an electronic alarm or electronic visual indicator assembly for signaling when the dough reaches a specific volume.

Most of the prior art mentioned above does not provide for packaging of un-proofed dough products. Known packages that do provide for packaging of un-proofed dough do not indicate when the dough is ready or proofed. Letting dough proof for the proper amount of time is an art. The time it takes dough to proof is dependent upon many variables such as temperature, humidity, dough ingredients and the strain of yeast used in the dough. Thus, the proof time of dough is often misjudged and the dough is used either prematurely or after it has proofed. Furthermore, known proofing approaches for dough generally require the consumer to purchase a separate device, apart from the dough packaging, to determine when the dough is ready. Such known prior art devices that indicate when dough is ready tend to be expensive and more suited for commercial operations.

Furthermore, recent health concerns around the food packaging of popcorn in microwave ready packages have created a need for an expandable food package for popcorn that is chemical free, made from virgin fiber paperboard, recyclable and compostable.

SUMMARY OF THE INVENTION

Embodiments of the invention relate to packages for food products. More specifically, embodiments of the invention relate to inexpensive expandable packages in which dough can be sold and in which dough can be proofed to the correct/desired volume by consumers.

In one embodiment of the present invention the package has two portions, a first portion and a second portion. The first portion has a first closed end, at least one first side wall surrounding the first closed end, and a first open end opposite the first closed end. The second portion has a second closed end, at least one second side wall surrounding said second closed end, and a second open end opposite the second closed end. The first portion and second portion are movably connected at their respective open ends, such that an enclosed void of variable volume is created between the first closed end and the second closed end. Additionally, at least one indicator is placed in communication with the package such that when the package is expanded to a desired inner volume the indicator is activated. Activation of the indicator may produce, for example, a visual indication, an audio indication, an indication recognizable by touch, or any combination thereof.

The packages of the present invention provide for an inexpensive and easily manufacturable package for food products. Furthermore, the packages of the present invention provide for a dough package in which dough can be manufactured, sold, and proofed to the correct or desired volume without the need for separate more expensive devices.

In a further illustrative embodiment of the present invention, the packages of the present invention provide for a use as a food package for popcorn allowing for the popping of corn to a desired volume without the need for separate more expensive device. According to the invention, the instant food package can further be used as a serving container for the expanded food product.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 6 illustrates another embodiment of a pattern for making the portions of an expandable package;

DETAILED DESCRIPTION

Detailed embodiments of the present invention are disclosed herein, however, it is to be understood that the disclosed embodiments are merely exemplary of the invention, which may be embodied in various forms. Therefore, specific functional details disclosed herein are not to be interpreted as limiting, but merely as a basis for the claims and as a representative basis for teaching one skilled in the art to variously employ the present invention.

Figure 1:
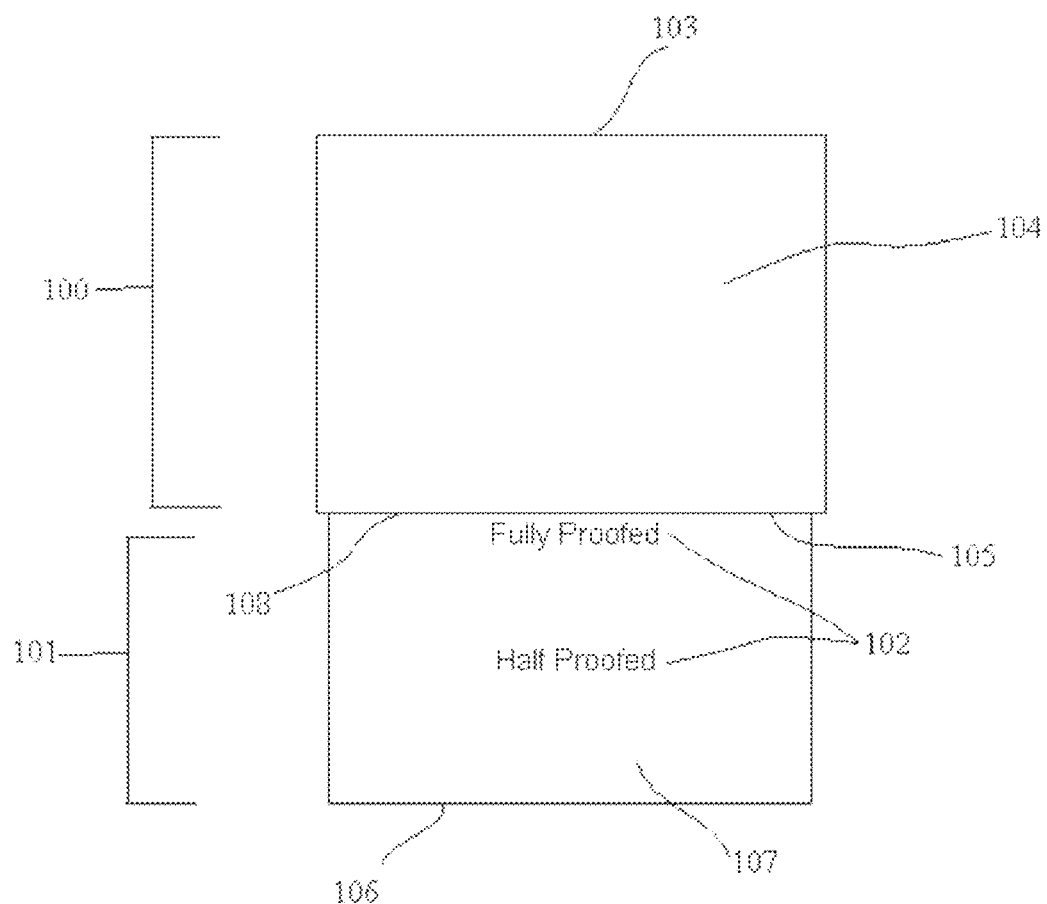
FIG. 1 illustrates an embodiment of an expandable package wherein the expandable package is expanded to show an indicator.
Figure 2:
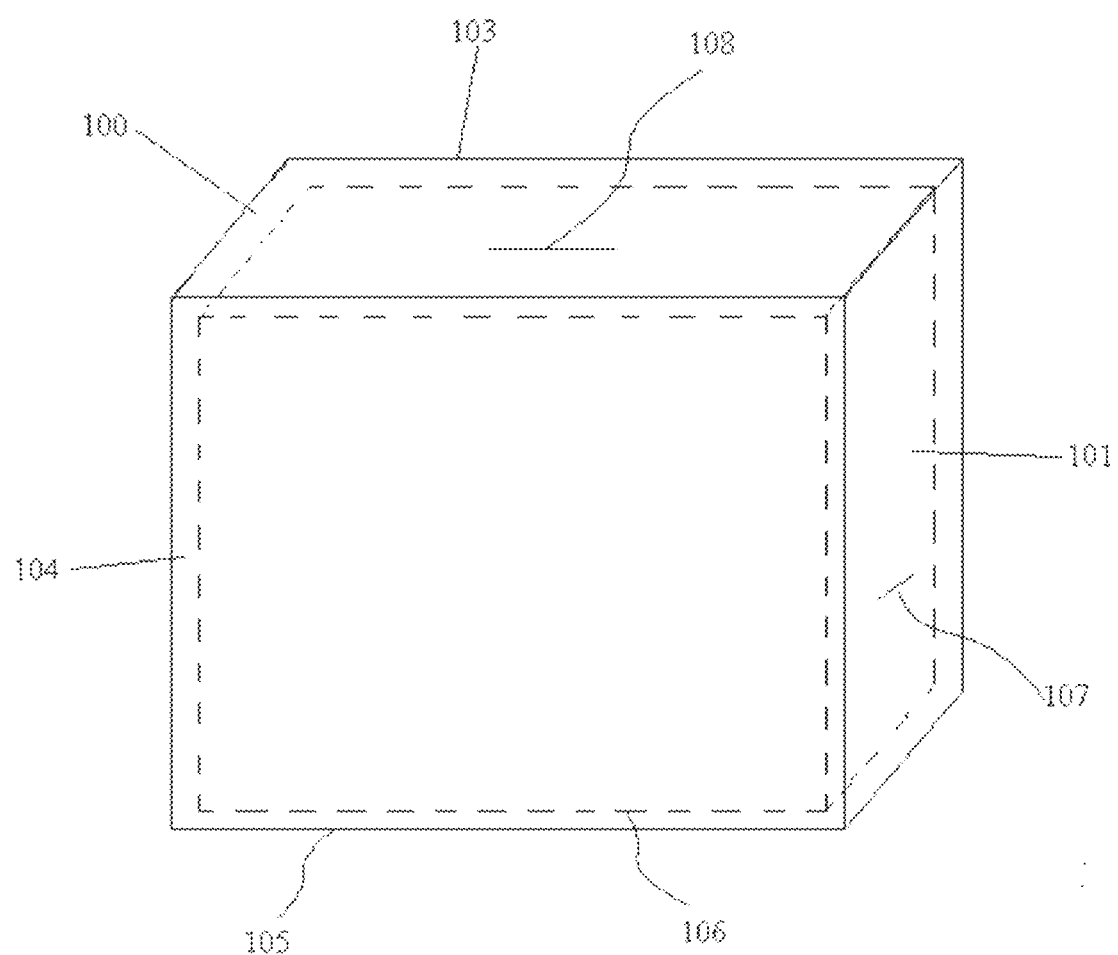
FIG. 2 illustrates an embodiment of an expandable package wherein the expandable package is fully collapsed.
Figure 3:
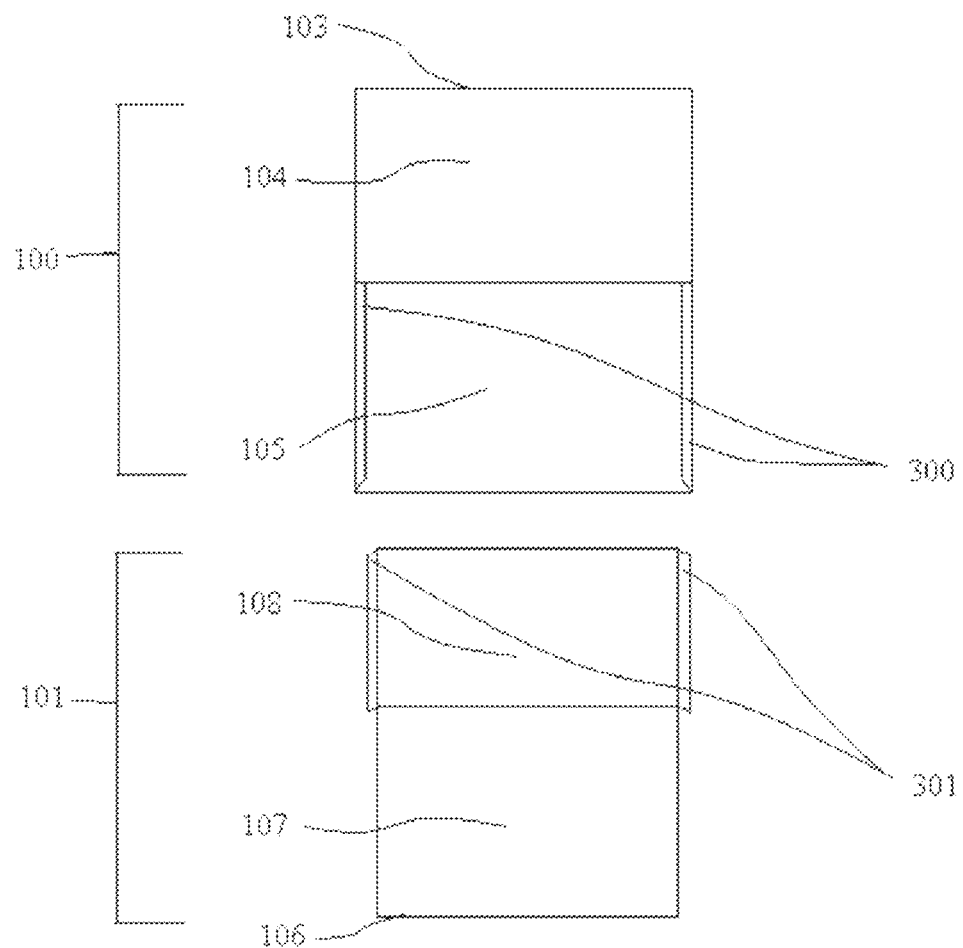
FIG. 3 illustrates an embodiment of an expandable package wherein the expandable package portions are separated to show the interface portions.

In general, aspects of the invention relate to packaging, and methods of making a package and packaging a food product. In one aspect, the invention relates to an expandable package for packaging food products. Referring first to FIGS. 1-3, wherein FIG. 1 depicts an expanded package with a square/rectangular cross section, FIG. 2 depicts a collapsed package with a square/rectangular cross section, and FIG. 3 depicts a package having a square/rectangular cross section with the package portions separated from one another. One embodiment of the package includes a first portion 100, a second portion 101, and at least one indicator 102.

The first portion 100 has a first closed end 103, at least one first side wall 104 surrounding the first closed end 103, and a first open end 105 opposite the first closed end 103. The second portion 101 has a second closed end 106, at least one second side wall 107 surrounding the second closed end 106, and a second open end 108 opposite the second closed end 106. The first portion 100 and second portion 101 are movably connected at their respective open ends 105 and 108 such that an enclosed void of variable volume is created between the first closed end 103 and the second closed end 106.

The at least one indicator 102 is placed in communication with the package such that when the package is expanded to a desired inner volume the indicator 102 is activated. As shown in FIG. 1, activation of the indicator 102 produces a visual indication that may read "Half Proofed," or "Fully Proofed" depending on the inner volume of the package. In a further illustrative embodiment a singular visual indication may read "Pop Corn Done," or may be just a simple line showing the food package is at full volume. It is contemplated within the scope of the invention that the visual indicator may reflect a variety of food products in various stages of readiness. Although, only printed words are shown in FIG. 1, it is contemplated that any number of any words, descriptions, phrases, symbols, pictures, combinations thereof, or other visual indication means may be used. It is further contemplated that activation of the indicator may produce, for example, a visual indication, an audio indication, an indication recognizable by touch, or any combination thereof.

In other embodiments, the indicator 102 is activated when the inner volume of the package reaches a volume in the range of about 90 to 94 cubic inches, and/or when the inner volume of the package reaches a volume in the range of about 108 to 112 cubic inches.

As shown in FIGS. 1-3, the package is depicted as having a square/rectangular cross section. However, in other embodiments of the package any cross sectional shape may be used, for example, a cross section that is circular, square, rectangular, octagonal, triangular, hexagonal, pentagonal, or any combination thereof.

Another embodiment of the package, as shown in FIG. 3, includes at least one first interface portion 300 at the first open end 105 of the first portion 100, and at least one second interface portion 301 at the second open end 108 of the second portion 101. These interface portions 300 and 301 engage with each other when the first and second portions 100 and 101 are connected and allow the package to expand and contract in volume as the first and/or second portion(s) 100 and 101 is moved. The purpose of the interface portions 300 and 301 is to prevent the package from expanding to far and separating the first and second portions 100 and 101 apart. As shown in FIG. 3, the interface portions are depicted as tabs folded inward on the first portion 100 and outward on the second portion 101. However, it is contemplated that any means of preventing the two portions 100 and 101 from separating apart when the package is expanded may be used.

Further embodiments of the package may include one or more of the following features. The first portion 100 wherein the first closed end 103 is capable of being opened such that the food product packed within can be removed. As shown in FIGS. 1-3, the package is shown as expanding vertically. However, in other embodiments of the package any configuration may be used, for example, the package may expand vertically, horizontally, or on an angle. Furthermore, FIGS. 1 and 2 depict the package as having a second portion 101 which is smaller that the first portion 100 such that the second portion 101 fits within the first portion 100. However, in other embodiments of the package the first portion 100 is smaller than the second portion 101 and is placed within the second portion 101.

Figure 4:
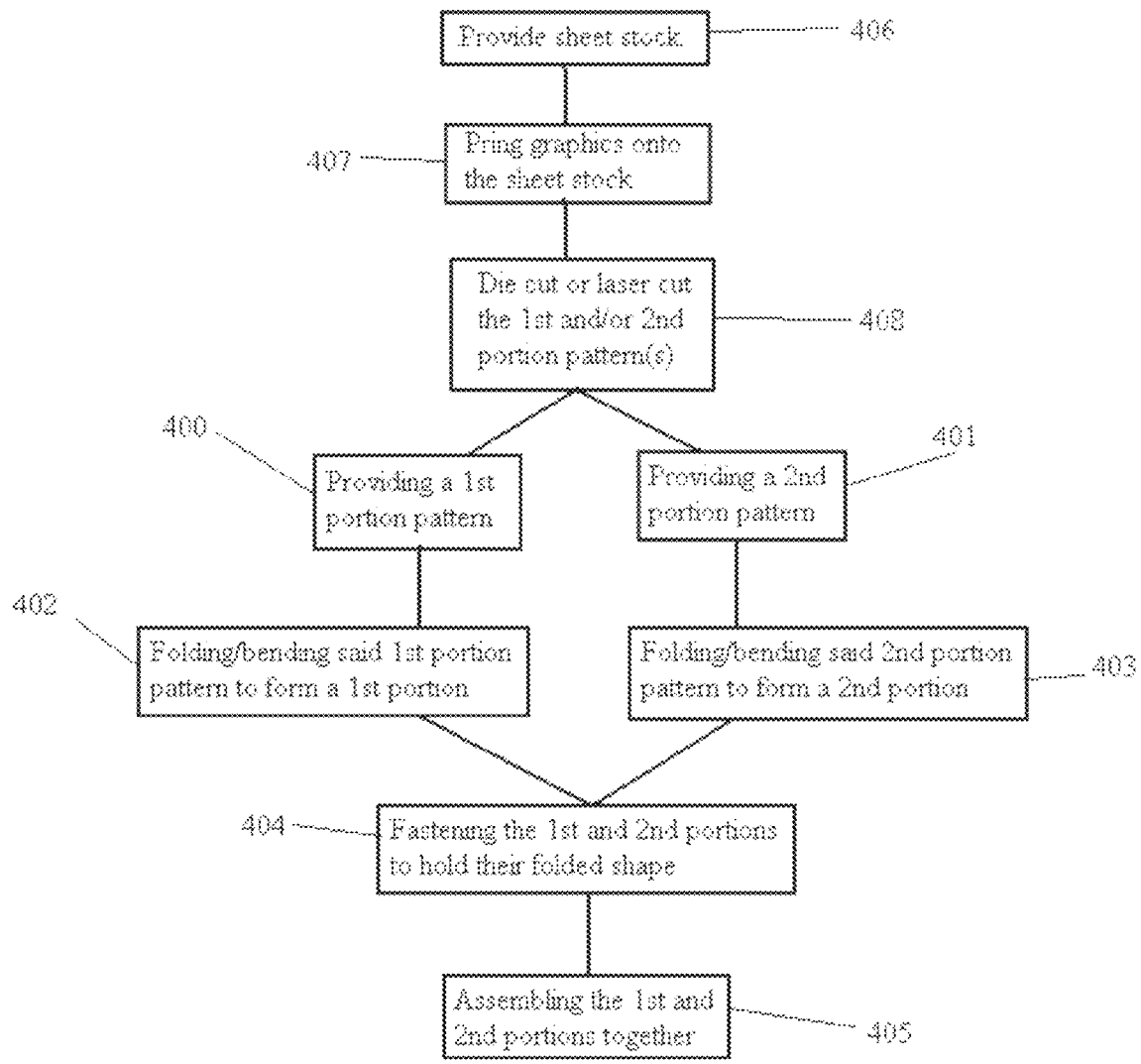
FIG. 4 illustrates an embodiment of a method of making an expandable package.

In another aspect, the invention relates to a method of making an expandable package. Referring to FIG. 4, one embodiment of the method for making a package includes providing a first portion pattern 400, providing a second portion pattern 401, bending or folding the first portion pattern 402, bending or folding the second portion pattern 403, fastening the first portion such that the first portion retains the folded configuration 404 and fastening the second portion such that the second portion retains the folded configuration 404, and assembling the first portion and the second portion 405.

More specifically, bending or folding the first portion 402 includes folding the first portion pattern to form a first portion having a first closed end, at least one first side wall surrounding the first closed end, a first open end opposite the first closed end, and at least one first interface portion at the first open end. Bending or folding the second portion 403 includes folding the second portion pattern to form a second portion having a second closed end, at least one second side wall surrounding the second closed end, a second open end opposite the second closed end, and at least one second interface portion at the second open end.

The fastening step 404 includes securing the bended or folded patterns with any adhesive material to maintain their bended or folded configurations of the first and second portions. Furthermore, assembling the first portion and the second portion 405 includes assembling the first and second portions such that the first interface portion of the first portion engages with the second interface portion of the second portion, and thus producing a package in which the first and second portions are movably attached to each other at their respective open ends.

Other embodiments of the method for making a package, may include one or more of the following steps: providing sheet stock for printing onto 406; printing graphics or other designs onto a sheet stock 407; and die cutting or laser cutting the patterns for the first and second portions out of a printed or un-printed sheet stock 408.

Figure 5C:
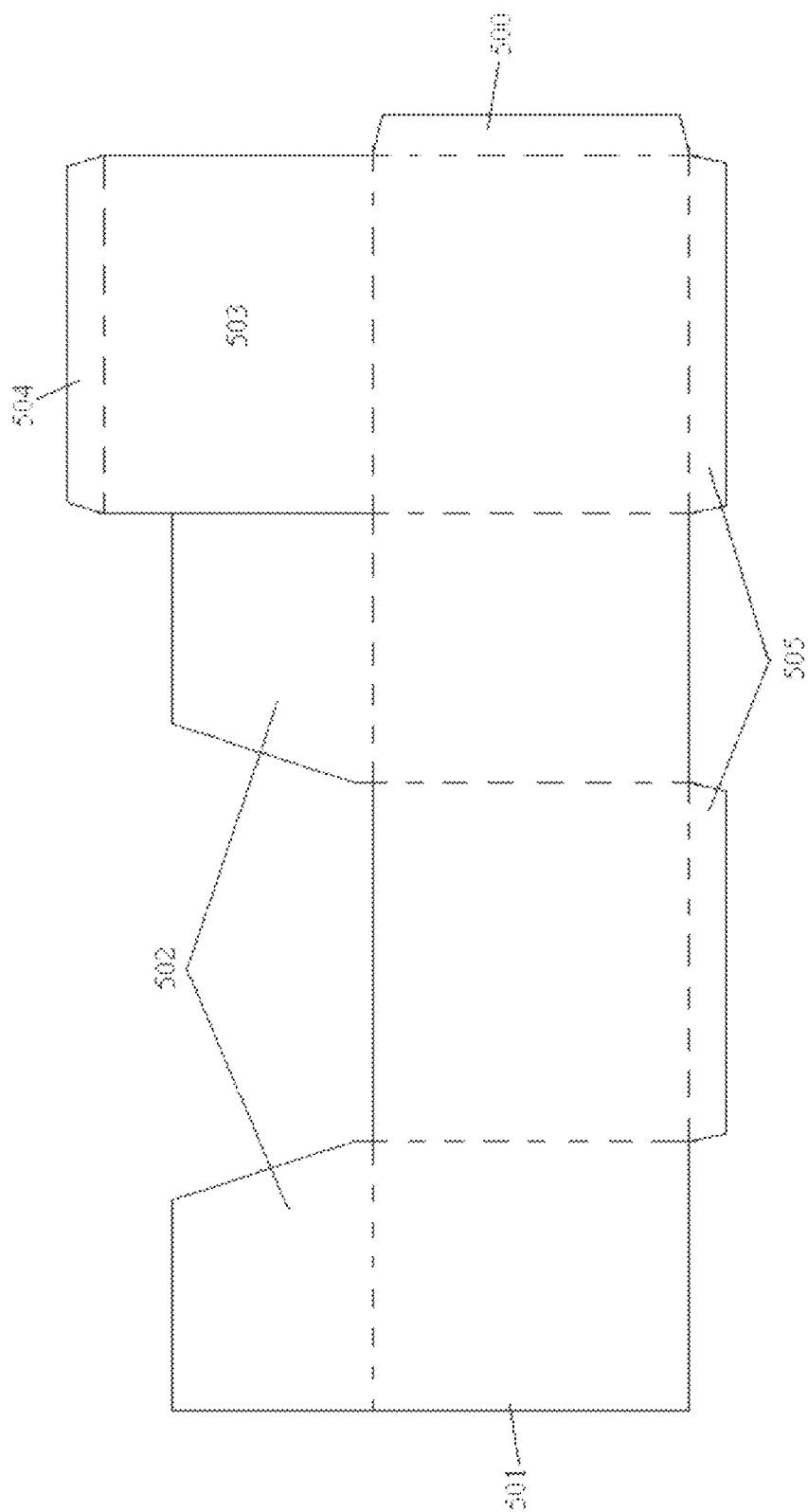
FIG. 5 illustrates an embodiment of a pattern for making the portions of an expandable package.

One example of a pattern for producing the first and/or second portions is shown in FIG. 5, wherein the dashed lines represent folds or bends. Bending/folding and fastening the pattern depicted in FIG. 5 into a first and/or second portion includes the following, not necessarily in the following order: fastening tab 500 to edge 501, folding the two tabs 502 toward the center, folding end 503 over the two tabs 502, inserting tab 504 into the enclosure, and folding the interface tabs 505 in the desired direction depending on which portion is being folded, as mentioned above.

Another example of a pattern for producing the first and/or second portions is shown in FIG. 6, wherein the dashed lines represent folds or bends. Bending/folding and fastening the pattern depicted in FIG. 6 into a first and/or second portion includes the following, not necessarily in the following order: fastening tab 600 to edge 601, folding the two tabs 602 toward the center, folding and interlocking the two end tabs 603 together over the two tabs 602 and fastening, and folding the interface tabs 604 in the desired direction depending on which portion is being folded, as mentioned above.

FIGS. 5 and 6 depict the pattern as producing a first and/or second portion having a square/rectangular cross section. However, in other embodiments of the pattern may produce a first and/or second portion having any cross sectional shape may be used, for example, a cross section that is circular, square, rectangular, octagonal, triangular, hexagonal, pentagonal, or any combination thereof. Although FIGS. 5 and 6 only provide two examples it is contemplated that other patterns could be used to create embodiments of the invention.

Figure 7:
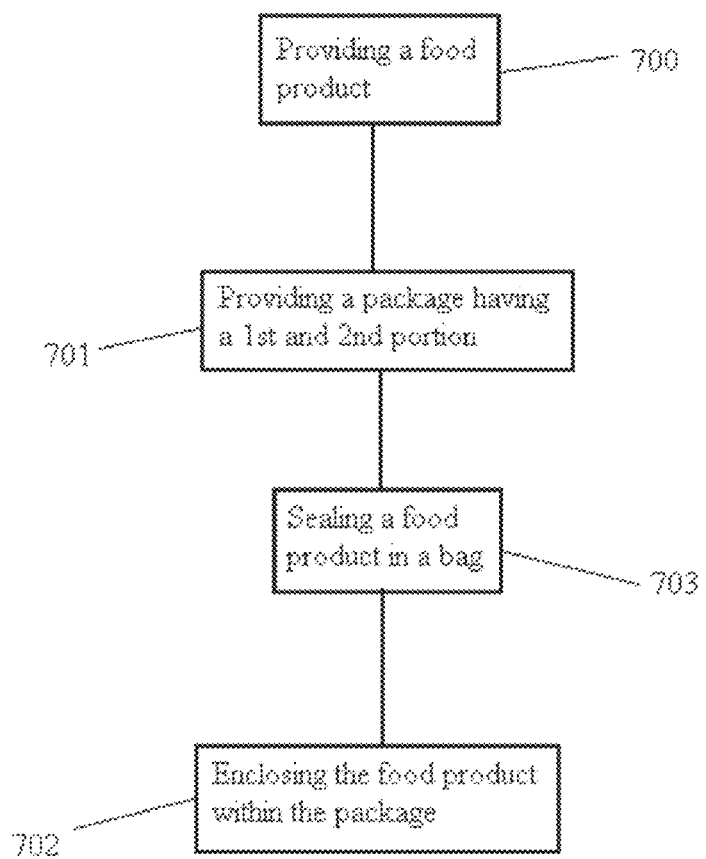
FIG. 7 illustrates an embodiment of a method of packaging a food product in an expandable package.

In another aspect, the invention relates to a method for packaging a food product. Referring to FIG. 7, one embodiment of the method of packaging includes providing a food product 700, providing a package 701, and enclosing the food product within the package 702. Providing a food product 700 may further include providing a food product such as dough or popcorn. Enclosing the food product within the package 702 may further include placing the food product inside the package and closing the package.

Furthermore, providing a package 701 includes providing a package, having a first portion, a second portion, and at least one indicator. The first portion has a first closed end, at least one first side wall surrounding the first closed end, and a first open end opposite the first closed end. The second portion has a second closed end, at least one second side wall surrounding said second closed end, and a second open end opposite the second closed end. The first portion and second portion are movably connected at their respective open ends. The at least one indicator is placed in communication with the package such that when the package is expanded to a desired inner volume the indicator is activated.

Figure 8:
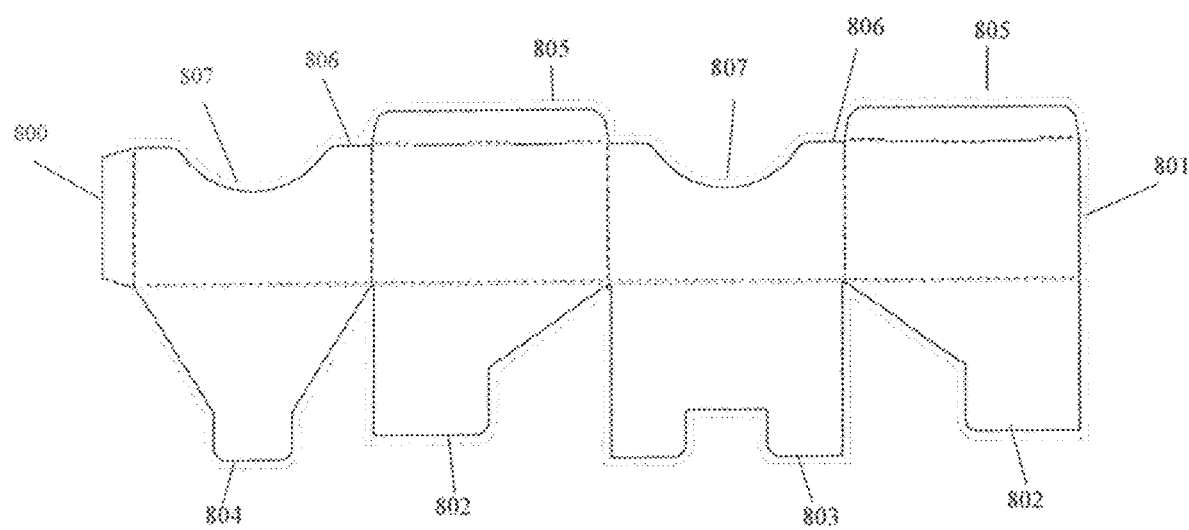
FIG. 8 illustrates an embodiment of a pattern for making the portions of an expandable package.

A further example of a pattern for producing the first and/or second portions according to the invention is shown in FIG. 8, wherein the dashed lines represent folds or bends. Bending/folding and fastening the pattern depicted in FIG. 8 into a first and/or second portion includes the following, not necessarily in the following order: fastening tab 800 to edge 801, folding the two tabs 802 toward the center, folding end 803 over the two tabs 802, inserting tab 804 into the enclosure, and folding the interface tabs 805 in the desired direction depending on which portion is being folded, as mentioned above. The folded pattern as depicted in FIG. 8 creates a bottom portion 810 of a food packaging according to the invention. This assembled bottom portion 810 is shown in FIGS. 10, 11, 12 and 13. According to the invention, as shown in FIGS. 8, 10, 11, 12 and 13 this pattern and resulting bottom portion 810 has side panels 806 each having a radial depressions 807 for receiving setting tabs 906 (shown in FIG. 9).

Figure 9:
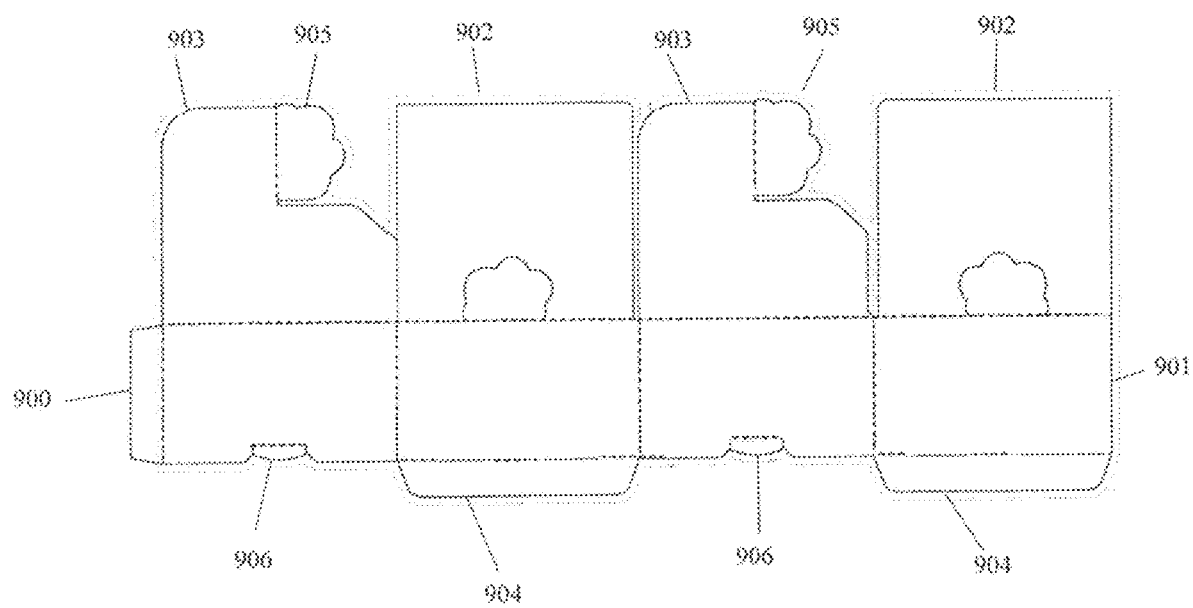
FIG. 9 illustrates another embodiment of a pattern for making the portions of an expandable package.
Figure 10:
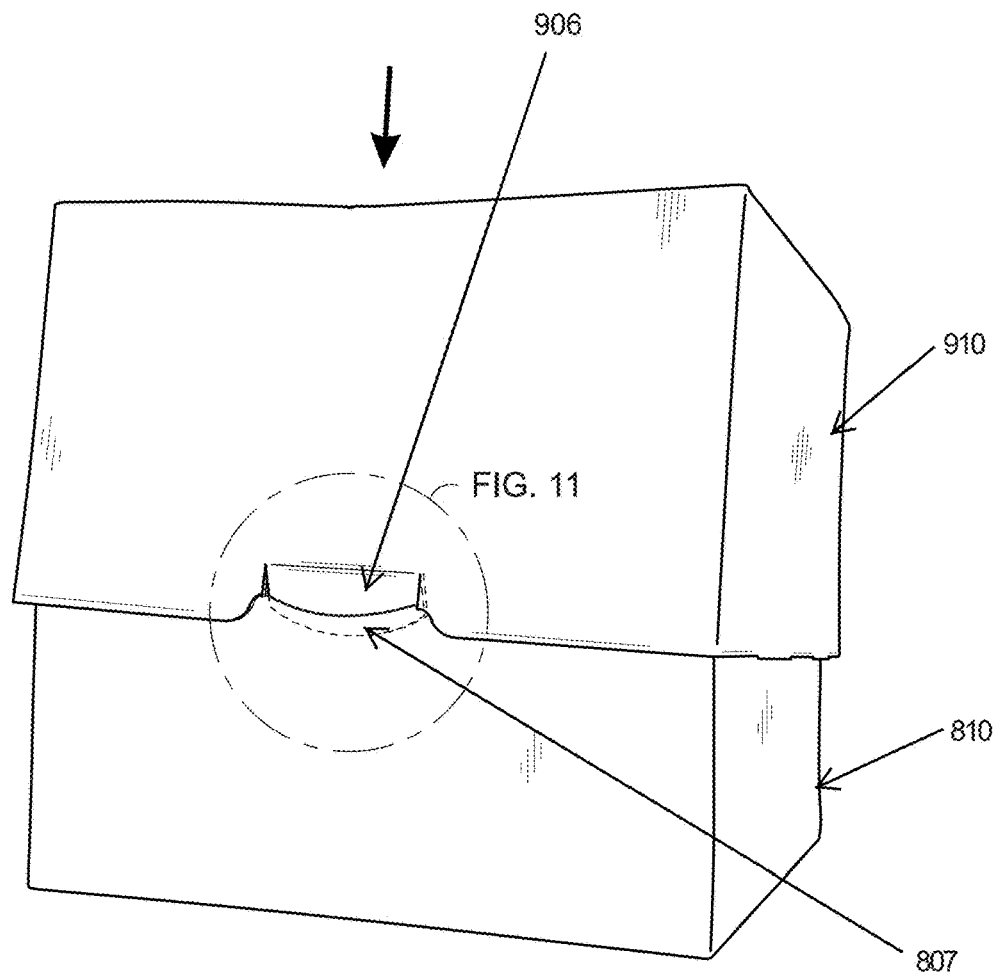
FIG. 10 illustrates an embodiment of an expandable package wherein the expandable package is engaged in a fully expanded packaged where the receiving setting tabs according to the invention are inserted in radial depressions according to the invention hold the expansion of the top and bottom portions in place.
Figure 11:
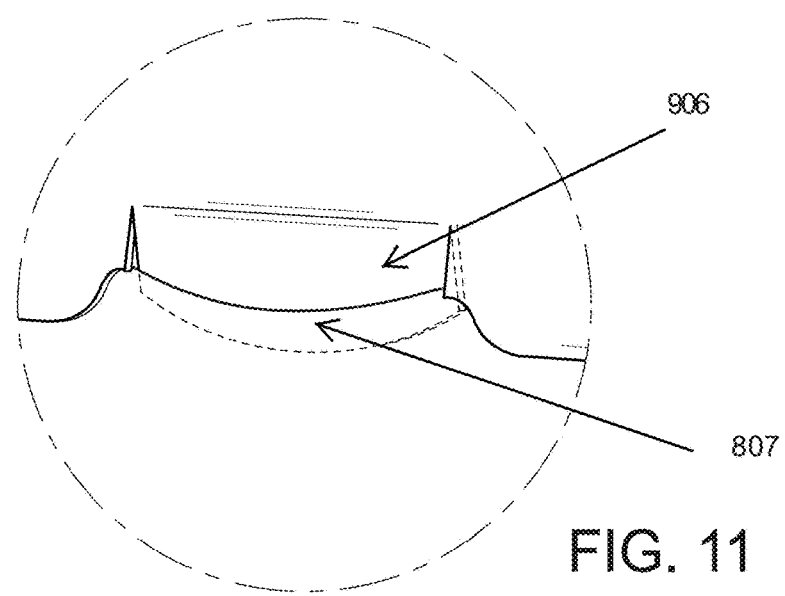
FIG. 11 illustrates the receiving setting tabs according to the invention inserted in radial depressions according to the invention.
Figure 12:
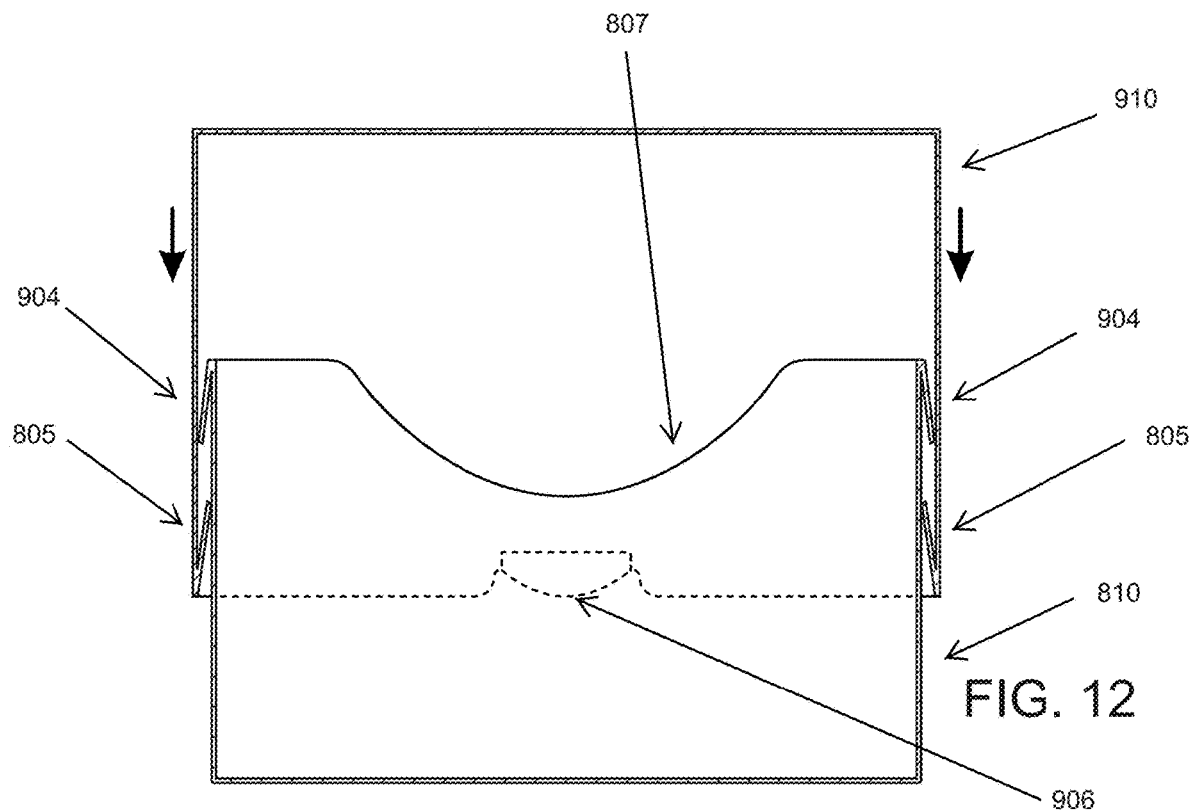
FIG. 12 illustrates an embodiment of an expandable package wherein the expandable package according to the invention is partially expanded packaged.
Figure 13:
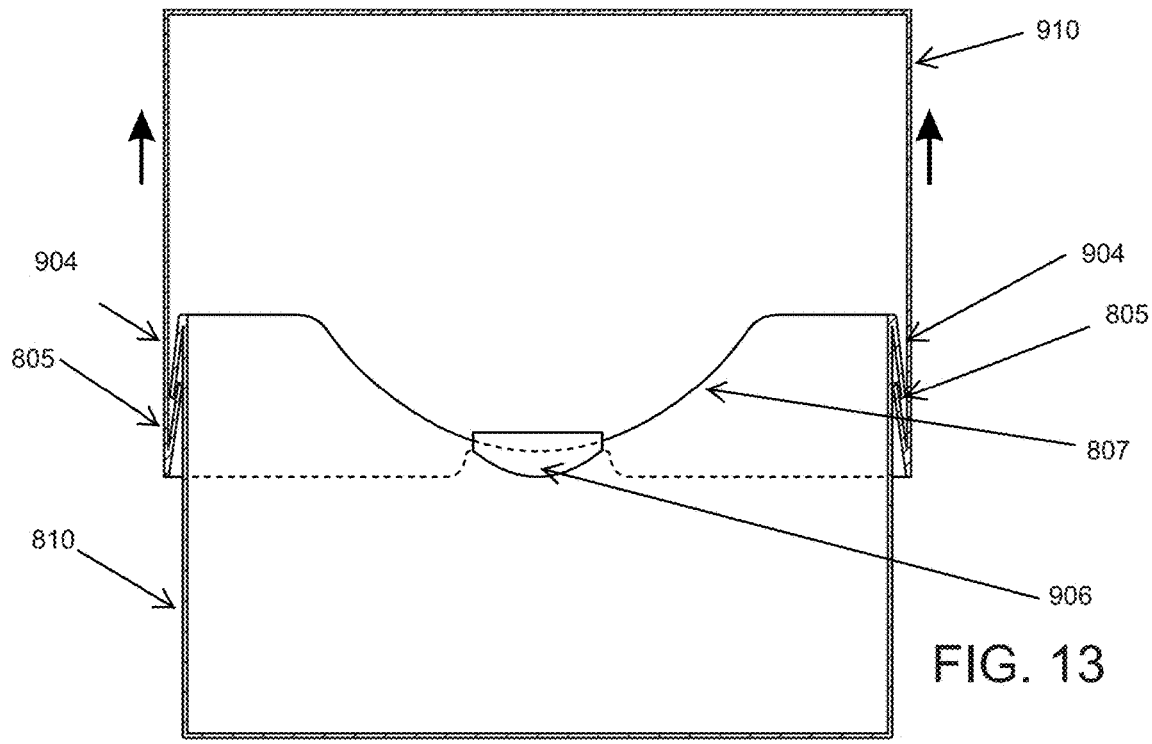
FIG. 13 illustrates an embodiment of an expandable package wherein the expandable package is fully expanded packaged wherein interlocking tabs according to the invention prevent the overexpansion of the expandable package according to the invention.

Another example of a pattern for producing the first and/or second portions according to the invention is shown in FIG. 9, wherein the dashed lines represent folds or bends. Bending/folding and fastening the pattern depicted in FIG. 9 into a first and/or second portion includes the following, not necessarily in the following order: fastening tab 900 to edge 901, folding the two tabs 902 toward the center, folding and interlocking the two end tabs 903 together over the two tabs 902 and fastening with the interlocking tabs 905 contained with the two end tabs 903, and folding the interface tabs 904 in the desired direction depending on which portion is being folded, as mentioned above. The folded pattern as depicted in FIG. 9 creates a top portion 910 of the food packaging according to the invention. This assembled top portion 910 is shown in FIGS. 10, 11, 12 and 13. As shown in FIGS. 9, 10, 11 and 12, this illustrative pattern has setting tabs 906 that interface with the radial depressions 807 of the bottom portion 810 (shown in shown in FIGS. 8, 10, 11 and 12). The setting tabs 906 allow the top portion of 910 and bottom portion 810 to remain in an expanded volume after the expansion of a food product within the first and second portion allowing one to use the food package according to the invention as a serving container. The interlocking tabs 905 allow for the top end of the top portion to be opened after the expanded food product is in its ready to consume state allowing access to expanded volume of a food product that is ready to consume. It is contemplated within the scope of the invention that the top portion 910 and bottom portion 810 in FIGS. 8, 9, 10, 11 and 12 can be utilized for expandable food products such as popcorn. It is further contemplated within the scope of the invention that any expandable food product may be packaged within the top_ portion 910 and bottom portion 810 depicted in FIGS. 8, 9, 10, 11 and 12.

According to the invention, FIGS. 8 and 9 provides a food package 701 having a first portion, a second portion, and at least one indicator. The first portion has a first closed end, at least one first side wall surrounding the first closed end, and a first open end opposite the first closed end. The second portion has a second closed end, at least one second side wall surrounding said second closed end, and a second open end opposite the second closed end. The first portion and second portion are movably connected at their respective open ends.

The at least one indicator is placed in communication with the package such that when the package is expanded to a desired inner volume the indicator is activated. The first or second portion that is a top portion of the food package has a closed end that can be opened with the package is expanded to a desired inner volume allowing access to the expanded food product.

FIGS. 8 and 9 depict the pattern as producing a first and/or second portion having a square/rectangular cross section. However, in other embodiments of the pattern may produce a first and/or second portion having any cross sectional shape may be used, for example, a cross section that is circular, square, rectangular, octagonal, triangular, hexagonal, pentagonal, or any combination thereof.

Another embodiment of the method of packaging further includes providing a package having interface portions, which prevent the package from expanding to far and separating the first and second portions apart. Providing a package with interface portions includes providing a first portion with at least one first interface portion at the first open end of the first portion and a second portion with at least one second interface portion at the second open end of the second portion.

Another embodiment of the method of packaging includes the step of sealing the food product in a bag 703. Sealing the food product in bag, within the package, prevents the food product from becoming contaminated during the storage, transportation, and manufacturing of the packaged food product. Furthermore, the food product can be sealed in a plastic bag, a thermoplastic bag, a foil or metallic bag, a paper bag, a bag having the desired barrier properties such as moisture or gas barrier properties, any other contamination preventing covering, or any combination thereof. Optionally, the step of sealing the food product in a bag 703 may further include sealing the food product in a bag having a large enough volume to expand the packaging enough to activate an indicator, allowing the food product to expand within the bag and reach the desired volume.

According to the invention, the patterns forming the food package are made from standard virgin fiber paperboard that is food grade. It is contemplated within the scope of the invention that the patterns may be made from card stock, paperboard, polymers and combinations thereof. It is further contemplated within the scope of the invention that layered materials containing layers of paper and polymeric films may form the material that the patterns are made from.

While the invention has been described and illustrated in connection with preferred embodiments, many variations and modifications will be evident to those skilled in the art and may be made without departing from the spirit and scope of the invention. The invention is thus not to be limited to the precise details of methodology or construction set forth above as such variations and modification are intended to be included within the scope of the invention.

What is claimed is:

1. A method of making popcorn using an expandable package,
the method comprising:
filling the expandable package with popcorn corn, the expandable package comprising: an inner box portion having a first closed end, a first side wall surrounding said first closed end, a first open end opposite said first closed end, and an outwardly folded flap portion of the first side wall adjacent the first open end; and an outer box portion having a second closed end, a second side wall surrounding said second closed end, a second open end opposite said second closed end, and an inwardly folded flap portion of the second side wall adjacent the second open end, wherein the inner box portion and the outer box portion are telescopingly engaged together such that the inner box portion moves within the outer box portion to form a closed box with a variable internal volume, wherein: the second open end faces the first closed end; and the first open end faces the second closed end;
closing the popcorn corn within the variable internal volume of the expandable package;
causing the popcorn corn to expand to pressurize the closed box such that the variable internal volume increases until the inwardly folding flap portion engages the outwardly folding flap portion preventing further expansion of said expandable package in a fully expanded state; and
after the expandable package is in the fully expanded state, operating a setting tab on an edge of the second side wall to engage the first side wall to maintain the variable internal volume at a current volume.

2. The method of claim 1, wherein causing the popcorn to expand to pressurize the variable internal volume includes:
expanding the expandable package to a partially expanded state to display a first visual indicator of the variable internal volume on the first side wall; and
expanding the expandable package to the fully expanded state, where the inwardly folding flap portion engages the outwardly folding flap portion, to display a second visual indicator of the variable internal volume on the first side wall.

3. The method of claim 1, wherein causing the popcorn to expand to pressurize the variable internal volume includes:
when the expandable package reaches the expanded state, displaying words on the first side wall indicating that the expandable package is at full volume.

4. The method of claim 1, wherein the expandable package is in the fully expanded state, and the variable internal volume is greatest, when the inwardly folding flap portion engages the outwardly folding flap portion.

5. The method of claim 1, wherein operating the setting tab includes inserting the setting tab within a radial depression of the first side wall to prevent the expandable package from collapsing.

6. The method of claim 1, further comprising assembling the expandable package from virgin fiber paperboard.

7. The method of claim 1, further comprising, after operating the setting tab, opening interlocking tabs on the second closed end to open the second closed end thereby opening the closed box for access to the variable internal volume.

8. The method of claim 1, further comprising, prior to filling the expandable package with popcorn corn, sealing the popcorn corn in a plastic bag, and wherein filling the expandable package with popcorn corn includes removing the popcorn corn from the plastic bag and pouring the popcorn corn into the expandable package.

9. The method of claim 1, further comprising assembling the expandable
package by:
providing a first pattern for the inner box portion;
bending the first pattern into a first folded configuration having a square cross section to form the shape of the inner box portion;

fastening the first pattern to retain the first folded configuration;

providing a second pattern for the outer box portion;

bending the second pattern into a second folded configuration having a square cross section to form the shape of the outer box portion;

fastening the second pattern to retain the second folded configuration; and movably attaching the inner box portion to the outer box portion.

10. A method of making popcorn using an expandable package, the method comprising: assembling the expandable package from virgin fiber paperboard;

sealing popcorn corn in a plastic bag;

removing the popcorn corn from the plastic bag and pouring the popcorn corn into the expandable package, the expandable package comprising: an inner box portion having a first closed end, a first side wall surrounding said first closed end, a first open end opposite said first closed end, and an outwardly folded flap portion of the first side wall adjacent the first open end; and an outer box portion having a second closed end, a second side wall surrounding said second closed end, a second open end opposite said second closed end, and an inwardly folded flap portion of the second side wall adjacent the second open end, wherein the inner box portion and the outer box portion are telescopingly engaged together such that the inner box portion moves within the outer box portion to form a closed box with a variable internal volume, wherein: the second open end faces the first closed end; and the first open end faces the second closed end;

closing the popcorn corn within the variable internal volume of the expandable package;

causing the popcorn corn to expand to pressurize the closed box such that the variable internal volume increases;

when the expandable package expands to a partially expanded state, displaying a first visual indicator of the variable internal volume of the expanding package on the first side wall;

when the expandable package expands to a fully expanded state where the inwardly folding flap portion engages the outwardly folding flap portion preventing further expansion, displaying a second visual indicator of the variable internal volume of the expandable package on the first side wall;

after the expandable package is in the fully expanded state, inserting a setting tab on an edge of the second sidewall into a radial depression of the first sidewall to prevent the expandable package from collapsing and to maintain the expandable package in the fully expanded state; and after the setting tab is inserted into the radial depression, opening interlocking tabs on the second closed end to open the second closed end thereby opening the closed box for access to the variable internal volume.

11. A method of making popcorn using an expandable package, the method comprising: providing an expandable package comprising:

an inner box portion having a first closed end, a first side wall surrounding said first closed end, a first open end opposite said first closed end, and an outwardly folded flap portion of the first side wall adjacent the first open end; and an outer box portion having a second closed end, a second side wall surrounding said second closed end, a second open end opposite said second closed end, and an inwardly folded flap portion of the second side wall adjacent the second open end, wherein the inner box portion and the outer box portion are configured to be telescopingly engaged together such that the inner box portion moves within the outer box portion to form a closed box with a variable internal volume, wherein: the second open end faces the first closed end; and the first open end faces the second closed end;

filling the expandable package with popcorn corn;

closing the popcorn corn within the variable internal volume of the expandable package;

causing the popcorn corn to expand to pressurize the closed box such that the variable internal volume increases until the inwardly folding flap portion engages the outwardly folding flap portion preventing further expansion of said expandable package in a fully expanded state; and after the expandable package is in the fully expanded state, operating a setting tab on an edge of the second side wall to engage the first side wall to maintain the variable internal volume at a current volume.

* * * * *